US009242621B2

(12) United States Patent
Caillot et al.

(10) Patent No.: US 9,242,621 B2
(45) Date of Patent: Jan. 26, 2016

(54) WINDSCREEN WIPER SYSTEM, PARTICULARLY FOR A MOTOR VEHICLE

(75) Inventors: Gerald Caillot, Cernay la Ville (FR); Jean-Michel Jarasson, Le Mesnil St Denis (FR); Vincent Izabel, Chilly Mazarin (FR)

(73) Assignee: Valeo Systèmes d'Essuyage, La Verriere (FR)

( * ) Notice: Subject to any disclaimer, the term of this patent is extended or adjusted under 35 U.S.C. 154(b) by 668 days.

(21) Appl. No.: 13/002,821

(22) PCT Filed: Jul. 15, 2009

(86) PCT No.: PCT/EP2009/005137
§ 371 (c)(1),
(2), (4) Date: Jan. 6, 2011

(87) PCT Pub. No.: WO2010/006775
PCT Pub. Date: Jan. 21, 2010

(65) Prior Publication Data
US 2011/0113580 A1    May 19, 2011

(30) Foreign Application Priority Data
Jul. 15, 2008 (FR) .................................... 08 04028

(51) Int. Cl.
*B60S 1/40* (2006.01)
*B60S 1/34* (2006.01)
(Continued)

(52) U.S. Cl.
CPC ................. *B60S 1/40* (2013.01); *B60S 1/3862* (2013.01); *B60S 1/524* (2013.01); *B60S 1/4038* (2013.01); *B60S 1/4045* (2013.01)

(58) Field of Classification Search
CPC .......... B60S 1/3862; B60S 1/524; B60S 1/40; B60S 1/4038; B60S 1/4045; B60S 1/4048; B60S 1/48; B60S 1/3415; B60S 1/3484
USPC ............. 15/250.01–250.04, 250.32, 250.361, 15/250.43, 250.201
See application file for complete search history.

(56) References Cited

U.S. PATENT DOCUMENTS 2,432,690 A * 12/1947 Smulski ...................... 15/250.04
2,483,243 A *  9/1949 Smulski ...................... 15/250.04
(Continued)

FOREIGN PATENT DOCUMENTS

DE    10 2004 056 835 A1    6/2006
DE    10 2005 060617 A1    6/2007
(Continued)

OTHER PUBLICATIONS
International Search Report w/translation from PCT/EP2009/005137 dated Sep. 24, 2009 (6 pages).

*Primary Examiner* — Gary Graham
(74) *Attorney, Agent, or Firm* — Osha Liang LLP

(57) ABSTRACT

The invention relates to a windscreen wiper system, particularly for a motor vehicle. The system comprises a wiper blade (4) hinged to a drive arm (1) via an adaptor (2) connected to the arm (1) and to a hydraulic connector (3), which in turn is connected to the blade (4) and comprises at least one inlet coupling (6) designed to be coupled to a cleaning and de-icing fluid feed (5). The system also comprises a rigid joining part (7, 8), one end of which is coupled to the inlet coupling (6), and the other end of which is intended to be coupled to the fluid feed (5). In this way, the connection between the fluid feed (5) and the connector is made secure and reliable. In addition, the joining part provides an offset which makes connecting and disconnecting easier for the user, particularly when the user wishes to change a worn blade, and enables the whole of the connection to be concealed more easily and then given a more attractive appearance.

6 Claims, 6 Drawing Sheets

Figure 2A:
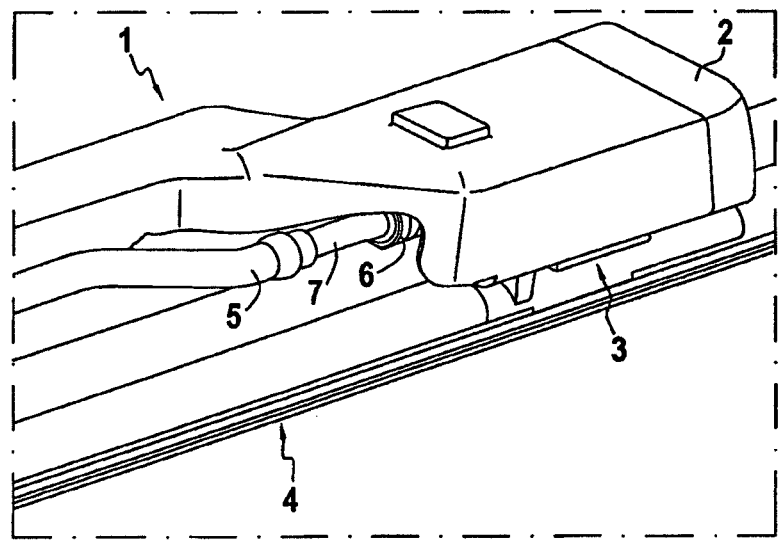

(51) Int. Cl.
   *B60S 1/46* (2006.01)
   *B60S 1/38* (2006.01)
   *B60S 1/52* (2006.01)

(56) References Cited

U.S. PATENT DOCUMENTS

| | | | | |
|---|---|---|---|---|
| 3,440,678 A | * | 4/1969 | Tibbet | 15/250.04 |
| 3,440,679 A | * | 4/1969 | Druseikis | 15/250.04 |
| 3,574,881 A | * | 4/1971 | Temple | 15/250.04 |
| 5,245,720 A | | 9/1993 | Schon | |
| 2007/0143947 A1 | | 6/2007 | Harita et al. | |

FOREIGN PATENT DOCUMENTS

| | | | |
|---|---|---|---|
| EP | 0 810 133 A2 | | 12/1997 |
| EP | 1 918 167 A1 | | 5/2008 |
| FR | 2 746 752 A1 | | 10/1997 |
| GB | 2085288 A | * | 4/1982 |

* cited by examiner

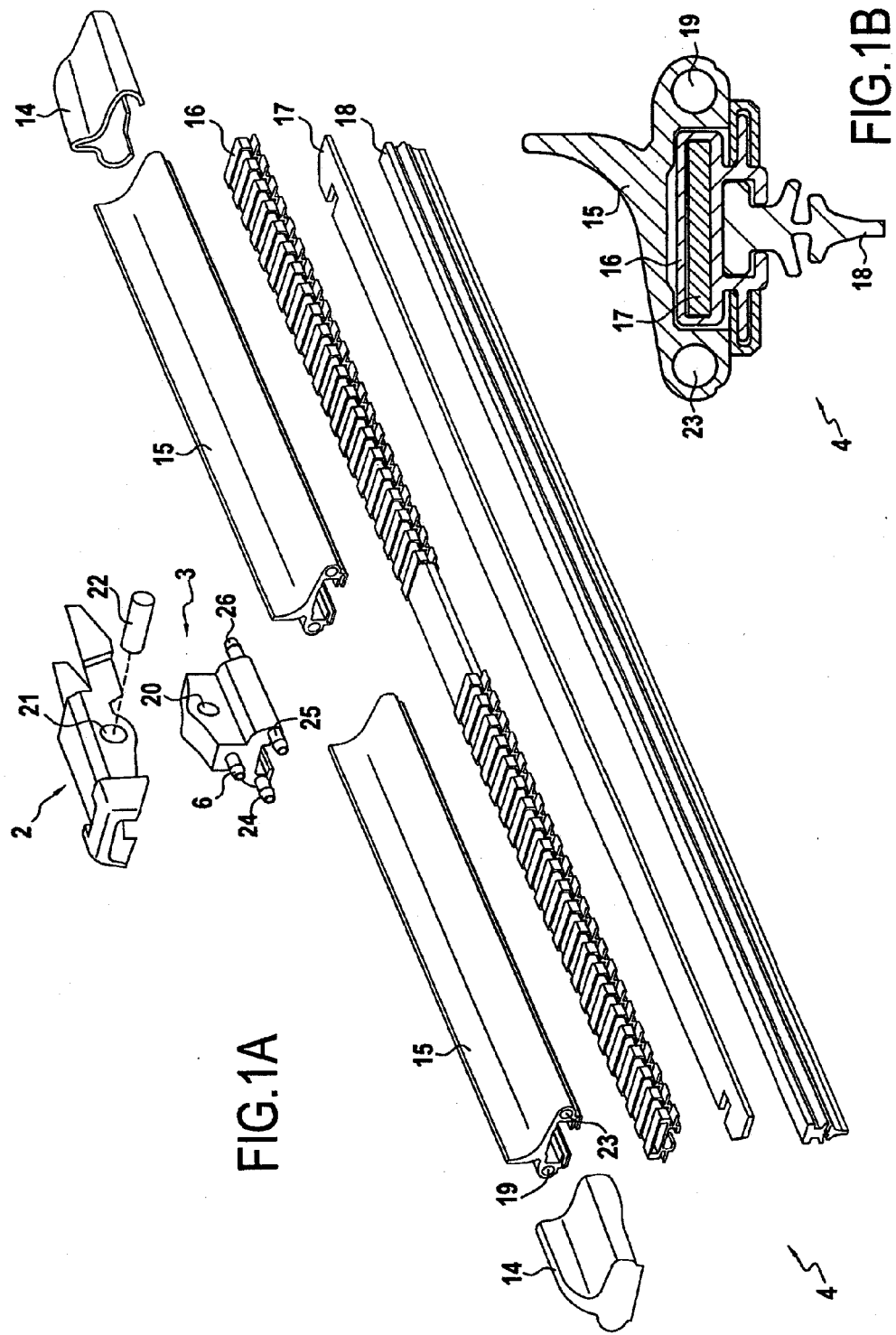

WINDSCREEN WIPER SYSTEM, PARTICULARLY FOR A MOTOR VEHICLE

The present invention is aimed at a windscreen wiper system more particularly for a motor vehicle.

Windscreen wiper systems, such as those used for cleaning or de-icing the windscreen of a motor vehicle, generally include a drive arm connected to a source of cleaning and/or de-icing fluid or liquid and to a motor as well as a wiper blade coupled to the drive arm.

During the wiping, a relative displacement exists between the arm and the blade so that the coupling between the arm and the blade must enable the rotation of the blade with respect the arm.

In addition, the blade must be easily connected to and disconnected from the arm to enable the replacement or maintenance thereof.

An adaptor is thus generally provided between the arm and the blade to provide such connection and the relative displacements mentioned above between the arm and the blade.

In the case where the ejection of the fluid is executed from nozzles, for example positioned on the hood of the vehicle, the connection between the arm and the blade has no other function than the ones mentioned above.

On the contrary, it can be provided for the fluid to be directly ejected from the wiper blade to spray the windscreen, with the view to increasing the accuracy and efficiency of the cleaning or of the de-icing operation.

In this case, it is necessary to bring the fluid up to the blade. Generally, the blade includes one or two cleaning and/or de-icing fluid supplying manifold(s). The fluid feed pipe or pipes can be directly connected to such manifolds. But then the fluid connection is not very reliable because of the relative displacement between the arm and the blade.

In addition, it is then difficult to conceal and to protect the fluid feed pipes.

A hydraulic connector is then generally used whereon the fluid feed is connected and which is coupled to the manifolds supplying the fluid to the wiper blade.

One of the problems lies in that the connection and disconnection are not simple operations for the user who wants to replace a worn blade.

As a matter of fact, the access to the connector which is positioned under the adaptor is difficult.

In addition, the risk exists for the fluid feed to be disconnected from the connector because of the relative displacements between the arm and the blade.

Another problem lies in that the overpressure stress generally generated parallel to the blade, so long as the fluid feed pipe is generally concealed and guided along the arm and thus opens at the connection oriented parallel to such blade. This overpressure stress may then disconnect the fluid feed pipe from the inlet coupling in the distributor.

The object of the invention is thus to bring a solution to the above mentioned problems among other ones.

The invention thus relates to a windscreen wiper system, more particularly for a motor vehicle including a wiper blade hinged to a drive arm via an adaptor.

This adaptor is connected on the one hand to the arm and on the other hand to the hydraulic connector.

Such hydraulic connector is connected to the blade and includes at least one inlet coupling designed to be coupled to the cleaning and/or de-icing fluid feed.

Characteristically, the system further includes at least one rigid joining part, one end of which is directly or indirectly coupled to the inlet coupling and the other end of which is intended to be directly or indirectly coupled to the fluid feed.

Then, the connection between the fluid feed and the connector is made secure and reliable.

In addition, the joining part provides an offset which makes connecting and disconnecting easier for the user, particularly when the user wishes to change the worn blade and enables the whole of the connection to be concealed more easily and thus giving it a more attractive appearance.

The rigid joining part is preferably oriented parallel to the blade.

The adaptor or the arm may include first locking means which cooperate with the rigid junction part to provide the holding thereof in position.

Such first locking means are preferably such that the cooperation between the joining part and such first locking means is provided along an axis perpendicular to the blade.

Such first locking means may include at least one cut provided in one of the walls of the adaptor or the arm.

Such cut can also be formed in a part added to the adaptor or to the arm, or cast into such adaptor or such arm.

The shape of the cut is such that the rigid joining part can be forcedly wedged in such cut temporarily.

Such first locking means more particularly make it possible to prevent the disconnection in case of overpressure and enable a stressless mounting for the user.

The system may include a cover directly or indirectly rigidly fixed on the arm behind the hinge of the blade of the arm, and under which the whole or a part of the joining part is positioned.

The cover more particularly makes it possible to offset the connection behind the arm/blade hinge for a better ergonomic position and to conceal the connection for an improved protection and appearance.

The cover may include second locking means which cooperate with the joining part to provide the holding thereof in position.

Such second locking means preferably are such that the cooperation between the joining part and such second locking means is provided along an axis perpendicular to the blade.

Such second locking means may include at least one cut formed in one of the walls of the cover.

Such cut can also be formed in a part added to the cover or cast therein.

The shape of such cut is such that such rigid joining part can be forcedly wedged in such cut temporarily. Such second locking means also make it possible to prevent disconnection in case of overpressure and enable a stressless mounting for the user.

The cover may include unlocking means making it possible to facilitate the unlocking of the joining part from the second locking means.

Such unlocking means preferably include at least one opening provided in the cover through which a lug formed in the joining part passes.

The system may also include a base rigidly fixed on the arm and on which the cover is hinged using a hinging means of the hinge type.

Preferably, the joining part is then integrated in the base.

The base and/or the cover may include a check valve and/or at least one electric connection element.

The system may include two rigid joining parts connected together by one of their two ends.

One of such two rigid joining parts is then directly or indirectly connected by the other end thereof to the inlet coupling and the second of these two rigid joining parts is then intended to be directly or indirectly connected by the other end thereof to the fluid feed.

Figure 2B:
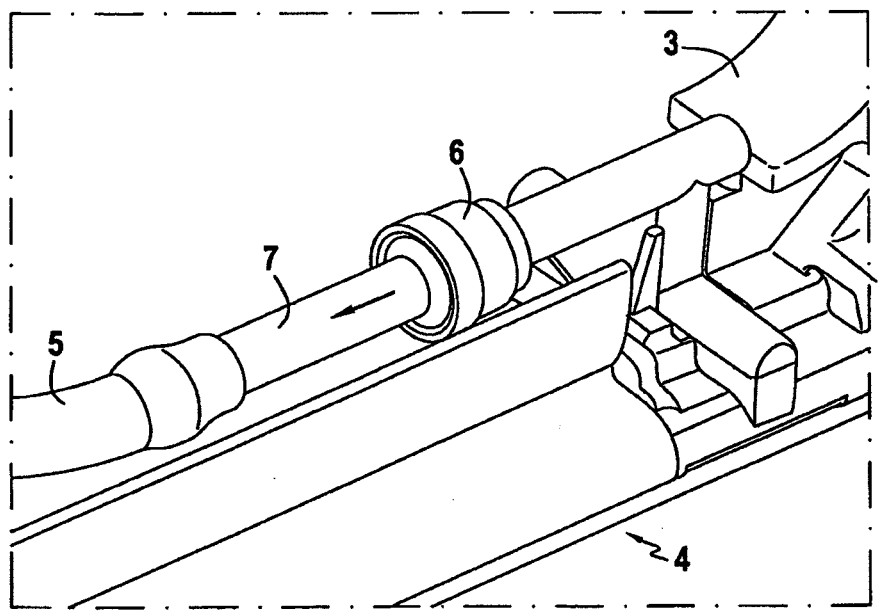
Figure 3A:
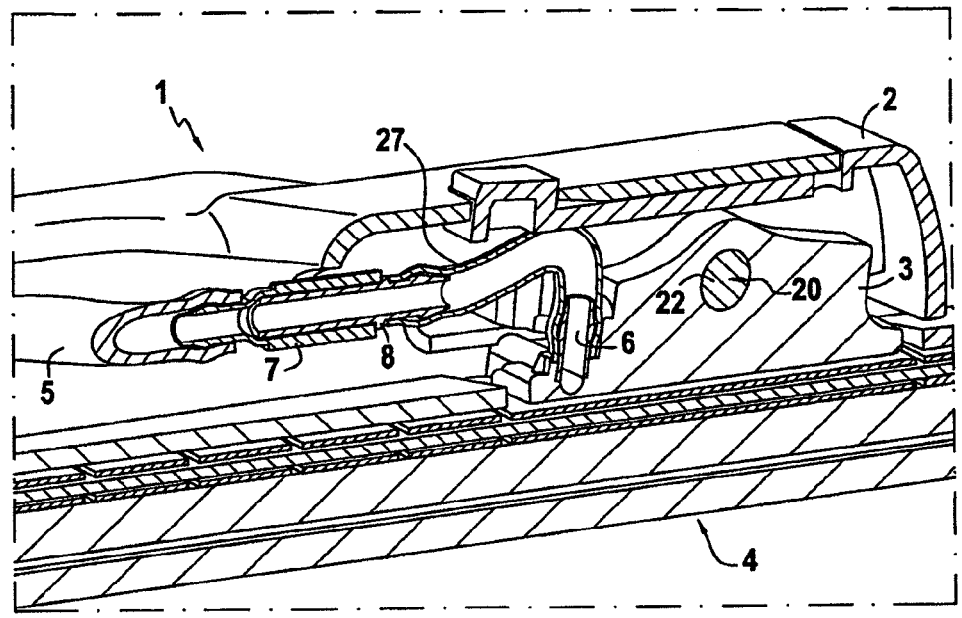
Figure 3B:
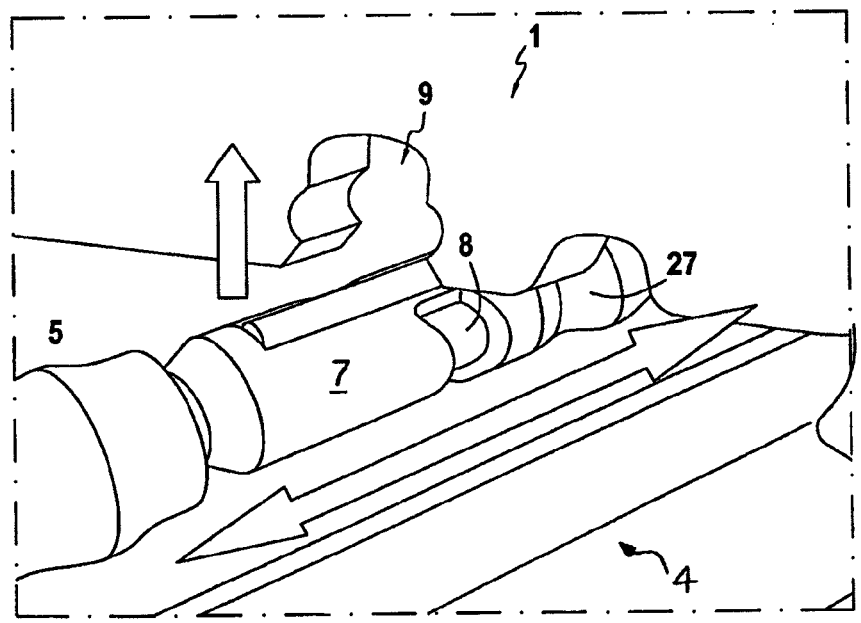
Figure 4A:
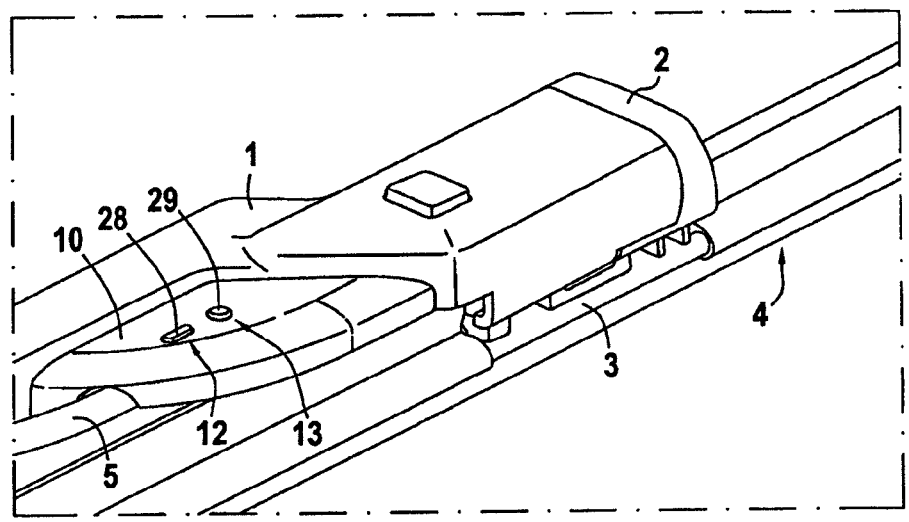
Figure 4B:
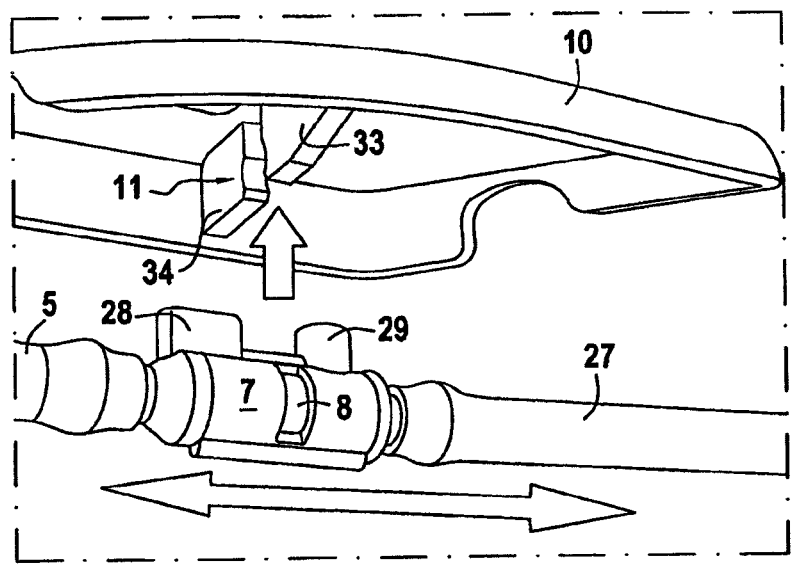
Figure 5A:
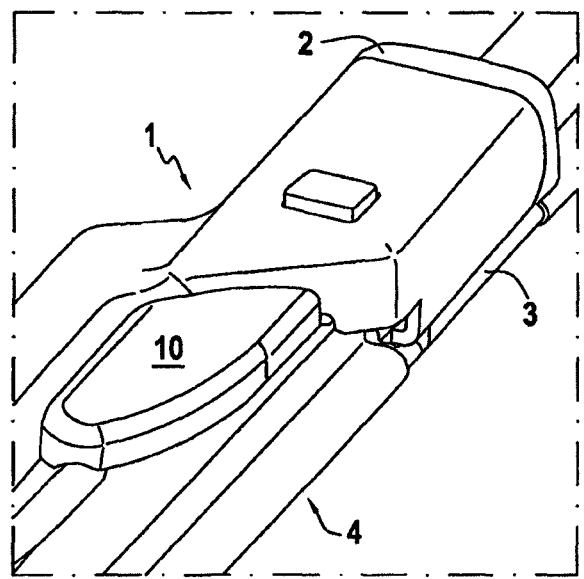
Figure 5B:
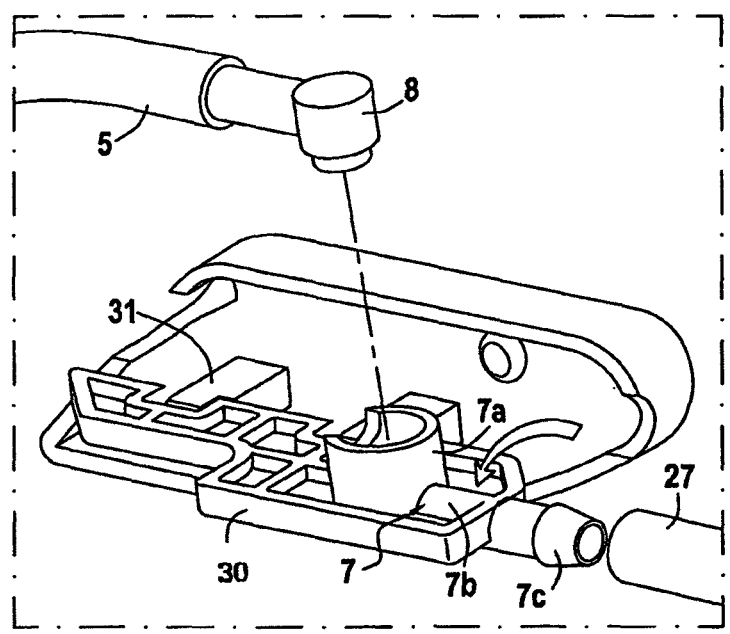
Figure 6A:
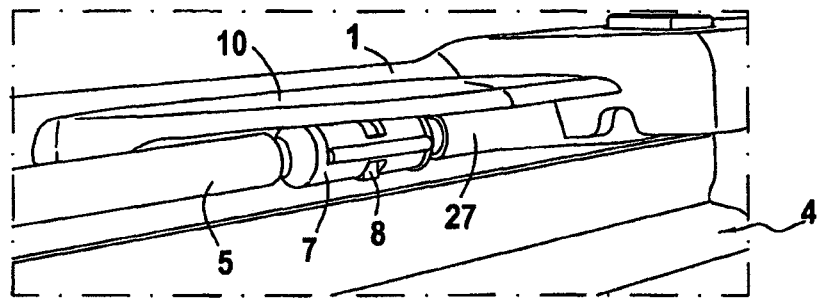
Figure 6B:
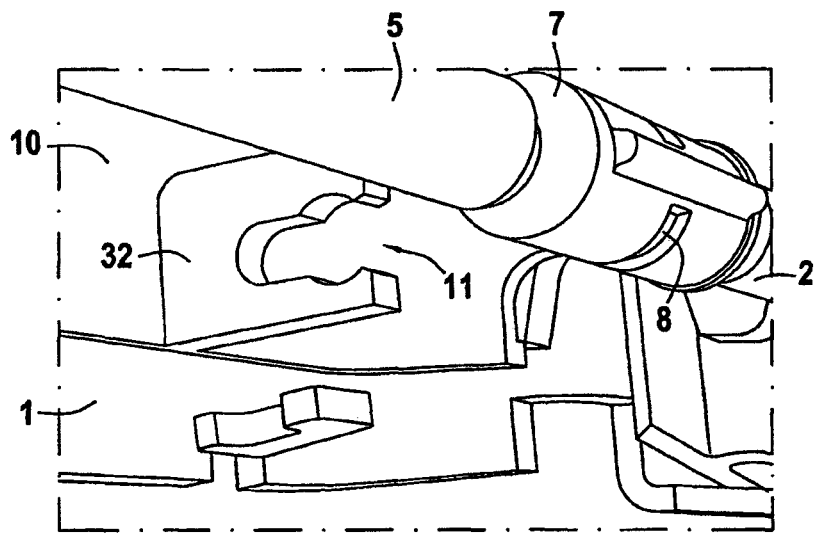

Other characteristics and advantages of the invention will appear more clearly and completely when reading the following descriptions of the preferred alternative embodiments which are given as non limitative examples and while referring to the following appended drawings:

FIGS. 1a and 1b: schematically show one exemplary wiper blade respectively as seen in an exploded perspective and transversal cross-section view, FIGS. 2a and 2b: schematically show the details of the connection between the arm and the blade according to a first example, FIGS. 3a and 3b: schematically show the details of the connection between the arm and the blade according to a second example, FIGS. 4a and 4b: schematically show the details of the connection between the arm and the blade according to a third example, FIGS. 5a and 5b: schematically show the details of the connection between the arm and the blade according to a fourth example, FIGS. 6a and 6b: schematically show the details of the connection between the arm and the blade according to a first example.

Such as shown in FIGS. 1a and 1b, the wiper blade 4 is connected to or intended to be connected to a drive arm (not shown) via an adaptor 2 to form a wiper system.

The adaptor 2 is rotatingly connected to a hydraulic connector 3 by means of a hinge axis 22 and the assembling ports 20 and 21 respectively provided in the connector 3 and the adaptor 2.

Such hydraulic connector 3 includes an inlet coupling 6 intended to be connected to the cleaning and/or de-icing fluid feed.

The connector 3 further includes several outlet connections 24, 25, 26 intended to be connected to the blade 4 fluid supplying manifold 19, 23.

Such blade 4 fluid supplying manifolds 19, 23 are, in this example, formed in the upper part of the blade 4, which plays the part of a deflector 15, formed in two parts 15 connected on each side of the connector 3. Such fluid supplying manifolds 19, 23 are provided with ports making it possible to spray the cleaning and/or de-icing fluid onto the windscreen.

As can be seen more precisely on the transversal cross-section in FIG. 1b, the deflector 15 has a profile so that it receives a mount 16. Such mount 16, according to the specific profile thereof, receives in turn a strip 17 and in the lower part thereof a rubber wiping blade 18 or the like.

Two tips or caps 14 close the ends of each part of the deflector 15 so as to close the end of the fluid supplying manifolds 19, 23, to prevent the mount 16, the strip 17 and the blade 18 from slipping out of their respective recesses as well as for aesthetic reasons.

In the example shown in FIGS. 2a and 2b, the connection between the arm 1 and the blade 4 via the adaptor 2 and the connector 3 can be seen.

This connection is visible in greater details in another example shown in section in FIG. 3a and which shall be described hereinafter.

The connector 3 is provided with an inlet coupling 6, oriented parallel to the blade 4 which is connected to the fluid feed 5 via the rigid joining part 7 also oriented parallel to the blade 4.

In this example, the rigid joining part 7 has a first end with a maximum diameter greater than the diameter of the end of the fluid feed flexible inlet 5 and which is forcedly introduced into such pipe 5. The sealing is thus provided by the deformation imparted to the pipe 5.

The other end of the rigid joining part 7 has a shape such that it cooperates with the end of the inlet coupling 6 of the connector 3 by forcedly penetrating this inlet coupling 6.

So long as the joining part 7 and the inlet coupling 6 are both rigid, a forced cooperation is obtained by clipping, thus also by deformation. However, a sealing joint can be provided in the inlet coupling 6 to provide the sealing.

The connection between the fluid feed 5 and the wiper 4 is then offset behind the connection between the arm 1 and the blade 4.

In the example shown in FIGS. 3a and 3b two rigid joining parts 7 and 8 provide the connections between the fluid feed 5 and the inlet coupling 6 of the connector 3.

More precisely, the connector 3 is rotatingly assembled with the adaptor 2 via the axis 22 in the assembling port 20. The adaptor 2 is in turn connected to the arm 1.

The inlet coupling 6 in the connector 3 is oriented perpendicularly to the blade 4 from the top of the connector 3.

The rigid joining part 7 is connected by a first one of its ends to the fluid feed 5, as explained here-above while referring to the examples shown in FIGS. 2a and 2b.

In addition, the rigid joining part 8 is connected by a first of its ends to the second end of the rigid joining part 7, for example by clipping which requires only a small effort from the user.

So long as the rigid joining set composed by both rigid joining parts 7 and 8 is oriented perpendicularly to the inlet coupling 6 and the connector 3, a flexible joining part 27 of the same type as the fluid feed 5 is provided to connect the second end of the rigid joining part 8 with the inlet connection 6.

Alternatively, the rigid joining part 8 could also have an overall L shape so as to be able to directly connect the inlet coupling 6.

As can be seen more precisely in FIG. 3b, the rigid joining parts 7 and 8, assembled as explained here-above, pass under one of the vertical walls of the arm 1. Such wall is provided with different locking means 9 and the form of a cut 9 wherein the rigid joining part 7 is introduced or forcedly wedged temporarily to enable the disassembling.

The shape of the cut 9 is thus adapted to the shape of the outer section of the rigid joining part 7 to enable the cooperation between the cut 9 and this rigid joining part 7 and thus the holding of such part in position.

Thus, in case of overpressure materialised in FIG. 3b by the double arrow oriented parallel to the blade 4, the rigid joining part 7 thus held in position is not disconnected. In addition, the mounting remains very easy for the user.

The cut 9, provided, in this example, in one of the vertical walls of the arm 1, could also be provided in one vertical wall of the adaptor 2.

In addition, if no vertical wall of the arm 1 or the adapter 2 is suitable, either because the arm 1 of the adaptor 2 has no such vertical walls or because the vertical wall or walls of the arm 1 or the adaptor 2 are not positioned in a suitable place, a cut can be provided in another vertical part of the arm 1 or the adaptor 2.

Such a vertical part can be added to or moulded in the arm 1 or adaptor 2.

As can be seen in FIG. 3b, via the arrow oriented perpendicular to the blade 4, the cooperation between the rigid joining part 7 and the first locking means 9 is provided perpendicular to the blade 4, thus perpendicular to the overpressure stress.

In the examples shown in FIGS. 4a and 4b, the arm 1 connected to the blade 4 via the adaptor 2 and the connector 3 can be seen.

Behind such hinge of the blade 4 on the arm 1, a cover 10 is rigidly fixed to the arm 1.

The rigid fastening of the cover 10 on the arm 1 can be direct as shown in FIG. 4a, or alternatively via a joining part.

The cover 10 covers the two rigid joining parts 7 and 8 as can be seen in FIG. 4b.

Alternatively, when both rigid joining parts 7 and 8 are very close to the connector 3 and partly under the portion of the arm 1 which covers the connector 3 and the adaptor 2, the cover 10 can cover only partially the rigid joining parts 7 and 8.

The cover 10 may include second locking parts 11 such as shown in FIG. 4b, intended to provide the holding in position of the rigid joining parts 7 and 8.

As for the first locking parts 9 described while referring to FIG. 3b, holding position of the rigid joining parts 7 and 8 is obtained by cooperation between the parts 7 and 8 and the second locking means 11 which is exerted perpendicularly to the blade 4 along the vertical arrow in FIG. 4b.

More precisely, the second locking means 11 include a cut 11 formed in the part 33, 34 which can be added onto the bottom of the cover 10 or moulded in this cover 10.

In the particular case of FIG. 4b, rather than forming the cut 11 in only one part, two parts 33, 34 which are added or moulded as explained here-above and the opposite edges of which form the cut 11, are used.

Similarly to what has been explained here-above as related to the first locking parts 9, the shape of the cut 11 makes it possible to forcedly wedge therein the rigid joining part 7 by temporary clipping.

Then again, in case of an overpressure materialised in FIG. 4b by the double arrow oriented parallel to the rigid joining part 7, such part 7 thus held in position is not disconnected. In addition, the mounting remains very easy for the user.

Locking means 12, 13 are preferably provided in the cover 10 to facilitate the unlocking of the rigid joining part 7 from the cut 11.

The unlocking means 12 and 13 include two through-ports 12 and 13 formed in the bottom of the cover 10. The rigid joining part 7 includes, on the surface thereof, two lugs 28 and 29 which penetrate both through-ports 12 and 13.

Both lugs 28 and 29 jet out from the surface of the cover 10 through both ports 12 and 13. The user can then force the rigid joining part 7 out of the cut 11 by pressing on these two lugs 28 and 29 so as to obtain the locking of such rigid joining part 7.

Of course, only one lug going through only one through-port may be enough. However, two through-ports 12 and 13 distributed on either side of the cut 11 are preferred with two associated lugs 28 and 29 in order to facilitate the unclipping of the rigid joining part 7 from the cut 11.

In the example shown in FIGS. 5a and 5b, the system includes a base 30 on which the cover 10 is hinged by one or several hinges 31.

The base 30 is rigidly fastened to the arm 1, directly or through a cover 10.

Reciprocally, the cover 10 is rigidly fixed to the arm 1 directly or via the base 30.

In this example, the base directly integrates the rigid joining part 7, wherein the rigid joining part 8 connected to the fluid feed 5 is connected.

The rigid joining part 7 is broken down into one part 7a which receives the end of the rigid joining part 8 and the part 7c which is connected to an intermediate flexible joining part 27 or directly in the coupling 6 of the connector 3 (not shown). Both parts 7a and 7b are connected by a central channel 7b.

Such a base 30, in addition to its limiting the effects of overpressure by holding in position the rigid joining parts 7 and 8 and facilitating the stressless mounting for the user, may include in addition functional parts which increase the performances of the system.

Then, a check valve and/or several electric connection elements may be for example integrated in the base 30. The electric connection makes it possible to heat the fluid for example.

Such additional functional parts, such as a check valve or an electric connection, can also be positioned in the cover 10 with or without the base 30.

Another example is shown in FIGS. 6a and 6b which is different from the example in FIGS. 4a and 4b simply in that the cut 11 of the second locking means 11 is formed in a unique part 32 which is added to or moulded in the cover 10, so that the cooperation between the rigid joining part 7 and this cut 11 is obtained perpendicularly to the longitudinal axis of the blade 4 but sideward and not upward.

This type of cooperation may also apply to the first locking means directly in the adaptor 2 or in the arm 1.

The whole description here-above is given as an example and is thus not a limitation of the invention.

More particularly, the number and the exact shape of the rigid joining parts 7 and 8 are not limitative to the invention. In fact, the precise shape of the cuts 9 and 11 is not a limitation of the invention either.

LIST OF DIGITAL REFERENCES

1—drive arm
2—adaptor
3—hydraulic connector
4—wiper blade
5—fluid feed
6—inlet coupling
7 (7a, 7b, 7c), 8—rigid joining parts
9—first locking means
10—cover
11—second locking means
12, 13—unlocking means
14—tips
15—deflector
16—mount
17—strip
18—wiping blade
19—manifold for supplying cleaning and/or de-icing fluid
20—port for assembling in the hydraulic connector
21—port for assembling in the adaptor
22—hinge pin
23—manifold for supplying cleaning and/or de-icing fluid
24, 25, 26—outlet couplings
27—connection pipe
28, 29—unlocking lug
30—base
31—hinge
32, 33, 34—second locking means

The invention claimed is:
1. A windscreen wiper system for a motor vehicle comprising:
a wiper blade hinged to a drive arm via an adaptor, wherein the adaptor is connected to said drive arm and to a hydraulic connector, said hydraulic connector being connected to said wiper blade and including at least one inlet coupling connected to a cleaning and/or de-icing fluid feed, wherein the windscreen wiper system further comprises a rigid joining part, one end of which is directly or indirectly coupled to said inlet coupling and the other end of which is intended to be directly or indirectly connected to said de-icing fluid feed, wherein the drive arm comprises first locking means that cooperate with the rigid joining part, and an end portion of the arm being channel shaped defining spaced side walls projecting from a back wall, the end portion further comprising a transverse wall extending from one of the side walls, wherein the first locking means comprise a cut formed in an edge of the transverse wall on the end portion of the drive arm.

2. The system according to claim 1, wherein the rigid joining part is oriented parallel to the wiper blade.

3. The system according to claim 1, wherein the first locking means are such that the cooperation between the joining part and said first locking means is provided along an axis perpendicular to the wiper blade.

4. The system according to claim 1, wherein a shape of the cut is such that the rigid joining part can be forcedly wedged into the cut.

5. The system according to claim 1, wherein the windscreen wiper system further comprises:

at least two rigid joining parts connected to each other by one of their ends, wherein one of such said two rigid joining parts being directly or indirectly connected by the other end thereof to the inlet coupling, and wherein the second one of such said two rigid joining parts being intended to be directly or indirectly connected to the de-icing fluid feed by the other end thereof.

6. A locking means on an adapter, the adapter hinging a wiper blade to a drive arm, wherein the adaptor is connected to said drive arm and to a hydraulic connector, said hydraulic connector being connected to said wiper blade and including at least one inlet coupling connected to a cleaning and/or de-icing fluid feed, the locking means comprising:

a cut formed in an edge of a transverse wall on an end portion of the drive arm, wherein the locking means cooperates with a rigid joining part, one end of which is directly or indirectly coupled to said inlet coupling and the other end of which is intended to be directly or indirectly connected to said de-icing fluid feed, the end portion of the drive arm being channel shaped defining spaced side walls projecting from a back wall, the end portion further comprising the transverse wall extending from one of the side walls.

* * * * *